(12) United States Patent
Fulton et al.

(10) Patent No.: US 11,516,093 B2
(45) Date of Patent: Nov. 29, 2022

(54) SYSTEMS AND METHODS FOR UPDATING THE CONFIGURATION OF A CLOUD SERVICE

(71) Applicant: ConnectWise, LLC, Tampa, FL (US)

(72) Inventors: Craig M. Fulton, Clearwater, FL (US); Stephen Burgess, St. Petersburg, FL (US); Arnold Bellini, III, Tampa, FL (US)

(73) Assignee: ConnectWise, LLC, Tampa, FL (US)

( * ) Notice: Subject to any disclaimer, the term of this patent is extended or adjusted under 35 U.S.C. 154(b) by 0 days.

(21) Appl. No.: 16/901,400

(22) Filed: Jun. 15, 2020

(65) Prior Publication Data

US 2021/0135956 A1  May 6, 2021

Related U.S. Application Data

(63) Continuation of application No. 16/105,099, filed on Aug. 20, 2018, now Pat. No. 10,686,676, which is a
(Continued)

(51) Int. Cl.
*G06F 15/177* (2006.01)
*H04L 41/5025* (2022.01)
(Continued)

(52) U.S. Cl.
CPC ............ *H04L 41/5025* (2013.01); *G06F 8/65* (2013.01); *H04L 41/069* (2013.01); *H04L 41/0631* (2013.01); *H04L 41/0645* (2013.01); *H04L 41/0686* (2013.01); *H04L 41/0816* (2013.01); *H04L 41/5061* (2013.01);
(Continued)

(58) Field of Classification Search
None
See application file for complete search history.

(56) References Cited

U.S. PATENT DOCUMENTS 9,229,800 B2 * 1/2016 Jain .................. G06N 5/022
9,350,681 B1   5/2016 Kitagawa et al.
(Continued)

FOREIGN PATENT DOCUMENTS

EP    2 801 938 A1   11/2014

OTHER PUBLICATIONS

Foreign Action other than Search Report on CA 3046468 dated Sep. 11, 2019.
(Continued)

*Primary Examiner* — Phuoc H Nguyen
(74) *Attorney, Agent, or Firm* — Foley & Lardner LLP

(57) ABSTRACT

The present disclosure facilitates improving the operation of a cloud service by updating its configuration information and its resource requirements. The resource utilization of the cloud service can be monitored, and a decision logic module can determine whether action is required. When action is required, an update can be prepared and applied, and notifications can be generated about the condition and its resolution. Resolutions can require correlation of multiple cloud services to provide real-time access to information that is not otherwise available to a single entity. Resolutions can be learned and predicted in a number of ways using a predictive engine.

20 Claims, 9 Drawing Sheets

Related U.S. Application Data continuation of application No. 15/809,715, filed on Nov. 10, 2017, now Pat. No. 10,057,140.

(60) Provisional application No. 62/421,057, filed on Nov. 11, 2016.

(51) Int. Cl.
| | |
|---|---|
| *H04L 41/5061* | (2022.01) |
| *H04L 43/0817* | (2022.01) |
| *H04L 41/069* | (2022.01) |
| *H04L 41/0686* | (2022.01) |
| *H04L 41/0631* | (2022.01) |
| *H04L 67/00* | (2022.01) |
| *G06F 8/65* | (2018.01) |
| *H04L 41/0816* | (2022.01) |
| *H04L 41/5074* | (2022.01) |
| *H04L 41/50* | (2022.01) |
| *H04L 43/08* | (2022.01) |
| *H04L 41/147* | (2022.01) |

(52) U.S. Cl.
CPC ...... *H04L 41/5074* (2013.01); *H04L 41/5093* (2013.01); *H04L 41/5096* (2013.01); *H04L 43/08* (2013.01); *H04L 43/0817* (2013.01); *H04L 67/34* (2013.01); *H04L 41/147* (2013.01)

(56) References Cited

U.S. PATENT DOCUMENTS

| | | |
|---|---|---|
| 9,794,117 B2 | 10/2017 | Narasimhan et al. |
| 10,225,208 B1* | 3/2019 | Prahlad ............... H04L 43/0811 |
| 10,382,266 B1* | 8/2019 | Balakrishnan ...... H04L 61/2007 |
| 2014/0075239 A1 | 3/2014 | Prathipati et al. |
| 2014/0136690 A1* | 5/2014 | Jain ..................... H04L 41/5012 709/224 |
| 2014/0280800 A1 | 9/2014 | Verchere et al. |
| 2014/0358944 A1* | 12/2014 | Brower, Jr. ............. G06F 16/22 707/748 |
| 2015/0050925 A1* | 2/2015 | Tapia ................ H04W 52/0203 455/418 |
| 2015/0227405 A1 | 8/2015 | Jan et al. |
| 2017/0178038 A1* | 6/2017 | Guven ................. G06Q 30/016 |
| 2017/0353543 A1* | 12/2017 | Baltar ................. H04L 41/0816 |
| 2018/0054356 A1 | 2/2018 | Narasimhan et al. |

OTHER PUBLICATIONS

Foreign Action other than Search Report on EP 17808672.4 dated Aug. 14, 2020.
International Preliminary Report on Patentability for application PCT/US2017/061141.
Notice of Allowance on U.S. Appl. No. 16/105,099 dated Feb. 5, 2020.
The International Search Report and the Written Opinion of the International Searching Authority for application No. PCT/US2017/061141 dated Jan. 23, 2018.
U.S. Notice of Allowance on U.S. Appl. No. 15/809,715 dated Apr. 25, 2018.
Examination Report on AU 2017357775 dated Sep. 17, 2021.

* cited by examiner

SYSTEMS AND METHODS FOR UPDATING THE CONFIGURATION OF A CLOUD SERVICE

CROSS-REFERENCES TO RELATED APPLICATIONS

This application claims the benefit of priority under 35 U.S.C. § 120 as a continuation of U.S. patent application Ser. No. 16/105,099, filed August, 2018 claims the benefit of priority under 35 U.S.C. § 120 as a continuation of U.S. patent application Ser. No. 15/809,715, filed Nov. 10, 2017, which claims the benefit of priority under 35 U.S.C. § 119 of U.S. Provisional Patent Application No. 62/421,057, filed Nov. 11, 2016, each of which are hereby incorporated herein by reference in their entirety.

FIELD OF THE DISCLOSURE

The present disclosure generally relates to improving the operation of a cloud service by updating its configuration. More specifically, the present disclosure relates to collecting the state information or resource utilization of a cloud service. The present disclosure can use the collected information to generate a ticket in a support system or other type of notification, generate a configuration update responsive to the ticket, and apply the configuration update to the cloud service.

BACKGROUND OF THE DISCLOSURE

A cloud service can include a server providing a service or a resource over a network to a client device. Several different client devices can be configured to access or utilize, via the network, one or more services or resources provided by the cloud service. However, as increasing numbers of client devices access various types of services or resources provided by the cloud service, it may be challenging to maintain a configuration on each of the client devices or identify and resolve errors to minimize a downtime of the service or resource.

SUMMARY OF THE DISCLOSURE

A cloud service can provide a service or resource over a network, such as the Internet. Cloud services can include Software as a Service ("SaaS"), Platform as a Service ("Paas"), or Infrastructure as a Service ("IaaS"). SaaS can include a software distribution model in which an application can be hosted by a vendor or service provider and made available to customers over the network. PaaS can include the delivery of an operating system and associated services of the network without downloading or installing the operating system. IaaS can include outsourcing equipment used to support operations, including storage, hardware, servers and network components, which can be access over the network.

Cloud services can provide useful facilities for client devices (or end users) by scaling the resources to match or correspond to the usage of the end user client devices. This can distribute the usage of fixed computing resources more evenly. For example, a cloud based email service can improve the capability of the service by increasing the storage space allocated to an end user to accommodate a temporary increase in incoming email with large attachments. In another example embodiment, a cloud based web service can improve the response of a web site by increasing the network bandwidth allocated to the site during a time of peak utilization, such as in response to a sale on an e-commerce site.

Thus, systems and methods of the present disclosure can improve the performance of a cloud service by, for example, improving the cloud service's capacity, response time, latency, or capabilities. For example, a system can measure characteristics of the cloud service. The system can process the measured characteristics among multiple client devices or resources to generate a support ticket or notification for a customer support system. The customer support system can receive, via a network interface of the customer support system, the ticket or notification generated by the system. The customer support system can generate, responsive to the ticket or the notification, a configuration update to improve the performance of the cloud service. The system or the cloud service can apply the generated configuration update to the cloud service. Thus, the system can improve the performance of the cloud service by updating a configuration of the cloud service based on, or responsive to, processing measured characteristics of the cloud service among multiple client devices or resources.

Cloud services can provide services in a multi-tenanted fashion, where a single machine can provide the same service to multiple groups of end users in such a way that each group is unaware of the others and has exclusive access to one complete instance of the cloud service. This multi-tenancy can be implemented natively, where the cloud service itself can be designed to present multiple isolated instances of the service. Multi-tenancy can be implemented using multiple virtual machines, where each virtual machine can run a separate instance of the cloud service. In either implementation, the multiple instances of the cloud service used by multiple tenants can share resources of the underlying physical machine while still maintaining the independence of the instances. This can be implemented by having separate configuration and state information for each instance of the cloud service. For example, each instance of a cloud based email service may have a different set of mailboxes (state information) and a different email domain (configuration information). It may also be beneficial to have a global set of configuration and state information that can control the operation of the cloud service, independent of any particular instance. For example, a cloud based email service may have a log file for system level errors (state information) and a setting for the target maximum memory usage (configuration information).

Multi-tenancy may be advantageous for utilizing the resources of a machine more efficiently, since the peak usages of resources may be different for different tenants. In one example embodiment, two tenants using a cloud based email service may both have employees that check their email when they arrive in the morning, creating a peak load for the first hour of the work day, but the two tenants may have employees that are mostly in two different time zones, so the machine resources can be utilized for first one tenant, then the other. In another example embodiment, two tenants may be using a cloud based customer support system, but one tenant may be a travel agent with peak customer interaction during the summer vacation months, and another tenant may be a tax accountant with peak customer interaction during March and April, leading up to the Federal Tax filing deadline. In both cases, the staggering of peak resource usage may be helpful in utilizing the machine resources efficiently with the same resources handling both peak requirements instead of a separate set of resources for each peak.

In order to take advantage of the multi-tenancy properly, it may be necessary to adjust the configuration of the cloud service. To continue the email cloud service example embodiment previously, it may be necessary to set up a schedule that increases the total number of incoming email connections allowed for each tenant during the morning hour for that tenant's time zone. The configuration may take the form a resource allocation; to continue the customer support cloud service example embodiment described previously, it may be necessary to increase the overall maximum number of connections for both tenants, even though both tenants are not likely to use the entire allocation of the connection resource at the same time.

In order to determine the adjustments to the configuration of the cloud service, it may be necessary to correlate information about multiple tenants. In the above examples, the tenants may be unwilling or unable to share information about their operations, so the configuration changes for improving the operation of the cloud service may use real-time access to the anonymous cloud service statistics that may not be available to any single tenant, and may instead only be available to the system or systems running the cloud service.

Systems and methods of the present disclosure can improve the operation of the cloud service by updating the configuration of the cloud service and updating the resource allocation of the cloud service, based on measurement of state information and resource utilization of the cloud service. This improvement of the operation can utilize a novel database architecture that can query the database using a canonical representation of the state information and resource utilization. This improvement of the operation can also utilize a prediction engine to learn and anticipate conditions that arise in the normal use of the cloud service.

At least one aspect of the present disclosure is directed to a method for improving performance of a cloud service. The method can include a collector component executed by a service configuration system comprising one or more processors receiving, from a cloud service, data packets comprising state information corresponding to a plurality of client devices that access the cloud service via a network. The cloud service can be configured to provide one or more services to the plurality of client devices via the network. The method can include a decision component executed by the service configuration system determining to generate a first notification of an error (e.g., disruption of service, outdated configuration information, exceeded capacity, virus, malicious code, malware, hardware failure, or latency) based on a comparison of a characteristic of a first client device of the plurality of client devices stored in the state information received by the collector component. The method can include the decision component storing the first notification of the error in memory of the service configuration system. The method can include the decision component determining to generate a second notification of the error based on a comparison of a characteristic of a second client device of the plurality of client devices stored in the state information received by the collector component. The method can include a support application programming interface of the service configuration system generating a request for a configuration update responsive to correlating the first notification stored in memory of the service configuration system and the second notification. The method can include the support application programming interface providing, responsive to the request generated by the decision component, a configuration update to the cloud service to cause the cloud service to update a configuration of the cloud service.

The service configuration system can measure a characteristic of resource utilization of the cloud service. The service configuration system can generate the request for the configuration update based on the characteristic of resource utilization.

The service configuration system can measure a first resource utilization of the cloud service associated with the first client device. The service configuration system can measure a second resource utilization of the cloud service associated with the client device. The service configuration system can input the first resource utilization and the second resource utilization into a prediction engine. The service configuration system can receive, from the prediction engine, a predicted resource utilization for the plurality of client device. The service configuration system can generate an alert responsive to the predicted resource utilization greater than a threshold.

The service configuration system can convert the alert into an electronic ticket. The service configuration system can transmit the electronic ticket to a customer support system.

The service configuration system can generate a first electronic ticket comprising the first notification of the error. The service configuration system can generate a second electronic ticket comprising the second notification of the error. The service configuration system can compare the first electronic ticket with the second electronic ticket to identify a match. The service configuration system can select a type of configuration update based on the match.

The service configuration system can generate a first electronic ticket comprising the first notification of the error. The first notification of error can be indicative of a disruption of an electronic mail service provided by the cloud service. The service configuration system can generate a second electronic ticket comprising the second notification of the error. The second notification of error can indicate a disruption of the electronic mail service provided by the cloud service. The service configuration system can compare the first electronic ticket with the second electronic ticket to identify a match corresponding to disruption of the electronic mail service provided by the cloud service. The service configuration system can generate a third notification responsive to the match. The service configuration system can transmit the third notification to a third client device from the first client device and the second client device, the third client device configured to access the electronic mail service provided by the cloud service.

The service configuration system can transmit the third notification to the third client device prior to the third client device failing to access the electronic mail service. The service configuration system can transmit the third notification via a communication channel provided by a service different from the electronic mail service with the disruption.

The service configuration system can transmit a query to the cloud service. The service configuration system can receive the data packets comprising the state information responsive to the query.

The service configuration system can transmit security credentials (e.g., username, password, token, pin number, or authentication code) along with the query. The service configuration system can receive the data packets comprising the state information responsive to validation of the security credentials (e.g., comparing the received security credentials with a previously established security credential or performing a hash function to validate the token).

At least one aspect can be directed to a system to improve performance of a cloud service. The system can include a collector component, a decision component, and a support application programming interface executed by a service configuration system comprising one or more processors. The collector component can receive, from a cloud service, data packets comprising state information corresponding to a plurality of client devices that access the cloud service via a network. The cloud service configured to provide one or more services to the plurality of client devices via the network. The decision component can determine to generate a first notification of an error based on a comparison of a characteristic of a first client device of the plurality of client devices stored in the state information received by the collector component. The decision component can store the first notification of the error in memory of the service configuration system. The decision component can determine to generate a second notification of the error based on a comparison of a characteristic of a second client device of the plurality of client devices stored in the state information received by the collector component. The support application programming interface can generate a request for a configuration update responsive to correlating the first notification stored in memory of the service configuration system and the second notification. The support application programming interface can provide, responsive to the request generated by the decision component, a configuration update to the cloud service to cause the cloud service to update a configuration of the cloud service.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
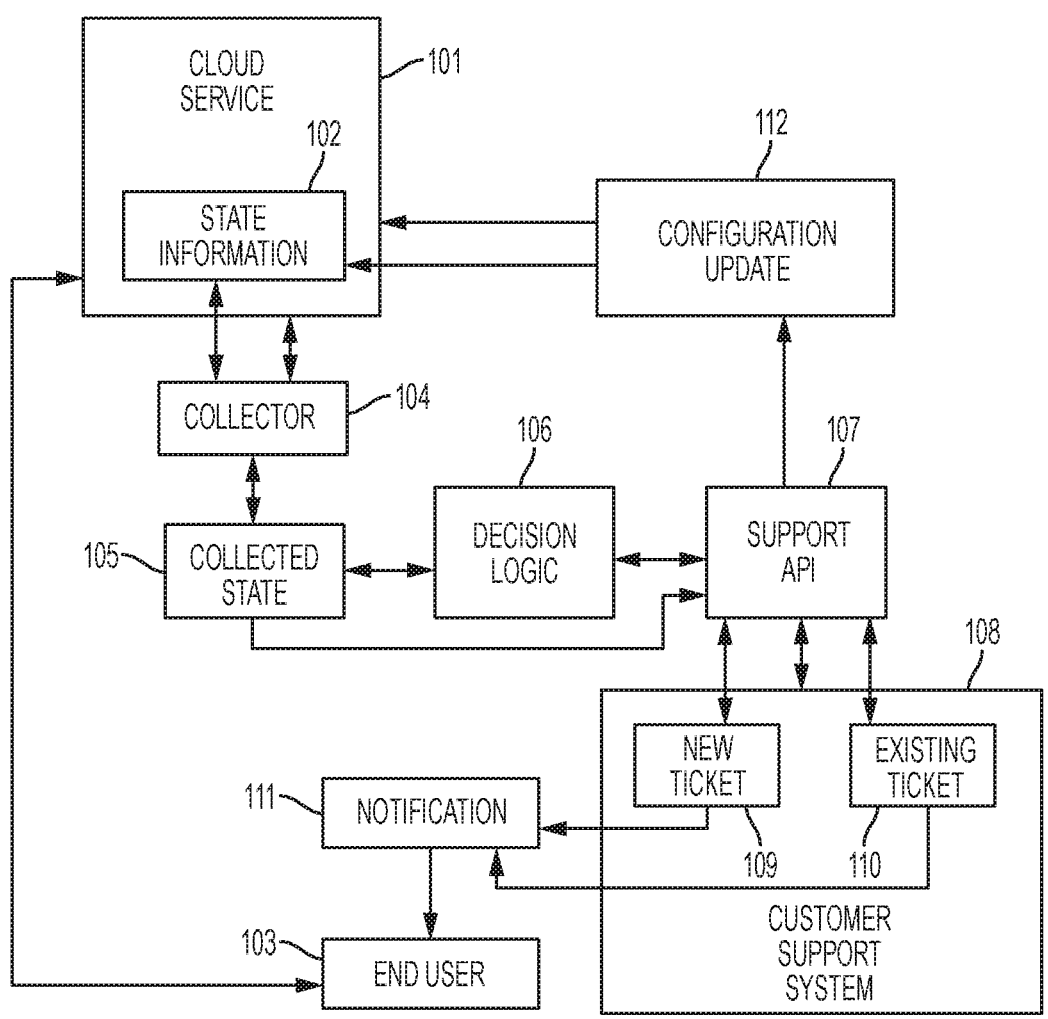
FIG. 1 is an illustrative block diagram of an example embodiment of a system for updating the configuration of a cloud service and communicating with a customer support system.

The state information and resource utilization that characterize a cloud service may be measured with improved accuracy compared to those of a service running on a corresponding physical machine. Similarly, the execution environment of a cloud service may be controlled more precisely that that of a service running on a corresponding physical machine. This may apply in both the case where a multi-tenanted cloud service is run natively on a machine, or in the case where virtual machines are used to manage multiple instances of a cloud service. In one example embodiment, in a cloud service that is multi-tenanted using multiple virtual machines, it may be possible to use an application programming interface (API) to the hypervisor to get a direct measurement of the network bandwidth utilization of each virtual machine, and therefore each tenant, separately, whereas the network driver on a physical machine may not be able to report per-process utilization, and may therefore not be able to provide network utilization for multiple tenants. On the control side, the hypervisor may provide an API to control CPU throttling of individual virtual machines, which may enable equitable resource sharing based on allocation, where in a physical machine, the operating system scheduler may not provide such fine grained control on a per-process level. This information and control can be used to improve the performance of the cloud service by applying configuration updates and resource allocations, based on the improved measurements, and utilizing the improved control features to apply those updates and resource allocations. The improved measurements may be used to more accurately predict the operation of the cloud service and may correspondingly improve the selection of the configuration updates and resource allocations. To continue the email cloud service example embodiment described previously, a review of the CPU utilization of the tenants may reveal peak CPU usage for two tenants at two different morning hours, resulting from the two tenants being in two different time zones, and it may be possible to allocate a higher CPU limit to each tenant during their peak operation time, providing a more efficient overall utilization of the machine CPU resource.

The improvement to the cloud service may rely on real-time access to information that is not available to the separate tenants, and may instead only be available to the cloud service itself. For example, the two tenants in the previous example may be legally obligated to prevent disclosure of their operations to each other, and may therefore not be able to coordinate the staggered increased CPU limit, but the neutral third party running the cloud service may be able to make this determination without reference to the details of the operations of either tenant.

The improved accuracy of the monitoring of cloud services may be used to improve the interface with a customer support system. State information measured about the cloud service can be processed using rules that drive decision logic to detect and characterize conditions that indicate a likely customer support situation, along with the information to characterize the situation. To continue the email cloud service example embodiment described previously, the measurement of the number of active connections to the email cloud service may be observed to exceed a fraction (for example, 90%) of the allocated quota for connections, and this may happen more frequently than a threshold rate (for example, 3 times in 1 hour). This may indicate a likely customer support situation, and as a result, an API to the customer support system may be used to generate a support ticket indicating the fact that the 90% threshold has been exceeded 3 times in 1 hour, along with information about the tenant (customer) that is affected, the number of connections that were observed, the allocation of connection resources, the times when the connections exceeded the threshold, the overall performance of the physical machine at that time, and so on. If a support ticket for this tenant and condition already exists, it may be preferable to update the existing support ticket with this additional information, rather than creating a new support ticket. To continue the customer support cloud service example embodiment described previously, note that there are two customer support systems involved: the first support system used by the customer to support the business (the travel agent or accounting firm in the example), and the second support system used to support that customer. These two support systems may be the same or different support systems, and may be running on the same or different physical or virtual machines. The measurement of ticket submission volume may be observed to exceed a threshold (for example, 100 tickets per hour), which may indicate a likely customer support situation, and as a result, an API to the second customer support system may be used to generate a support ticket indicating the fact that the threshold of 100 tickets per hour has been exceeded, along with information about the tenant (customer) that is affected, the number of tickets per hour that were created, the sources of the ticket creation, the overall performance of the physical machine, and so on. If a support ticket for this tenant and condition already exists on the second support system, it may be preferable to update the existing support ticket with this additional information, rather than creating a new support ticket.

The support system may be able to generate notifications based on the support tickets. To continue the email cloud service example embodiment described previously, it may be desirable to alert a customer service representative that the threshold has been exceeded for the number of connections, so that the customer service representative can contact the customer to discuss the situation and decide whether to take corrective action. It may also be desirable to notify the customer directly to make them aware of the situation. Multiple individuals may be notified, and the notification may use multiple channels, such as text message, email, voice message, social media posting, chat, and so on.

The support tickets and notifications for cloud service issues may be generated in addition to the application of configuration and resource allocation updates for improving the cloud service, or the application of updates may be contingent on an interaction with the support system. To continue the preceding example of the customer support system with an elevated ticket submission level, the increase in connection resources may imply an increased cost, and the customer may desire or require sign-off on the increased cost before applying the increase in the connection resources. In this case, the support system may facilitate the automation of the customer sign-off and approval of the application of the update.

A prediction engine may be used to anticipate likely customer support situations. To continue the customer support cloud service example embodiment described previously, the measurement of ticket submission volume may be done at a regular time interval and used as input to a prediction engine to estimate what the ticket submission volume may do in the future. The prediction may be compared to a threshold (for example, 100 tickets per hour), and the result may be indicative of a likely upcoming support situation. As a result, an API to the second customer support system may be used to generate a support ticket indicating the fact that the threshold of 100 tickets per hour is likely to be exceeded, along with information about the tenant (customer) that is affected, the number of tickets per hour that were created over the last few hours, the sources of the ticket creation, the overall performance of the physical machine over the last few hours, and so on. If a support ticket for this tenant and condition already exists on the second support system, it may be preferable to update the existing support ticket with this additional information, rather than creating a new support ticket. It may also be desirable to generate alerts based on the output of the prediction engine. For example, it may be desirable to alert a customer service representative that the threshold for the number of connections may be likely to exceeded in the future, so that the customer service representative can contact the customer to discuss the situation and decide whether to take preventive action. It may also be desirable to notify the customer directly to make them aware of the situation. Multiple individuals may be notified, and the notification may use multiple channels, such as text message, email, voice message, social media posting, chat, and so on.

Feedback may be used to improve the performance of the prediction engine. To continue the customer support cloud service example embodiment described previously, an additional measurement of ticket submission volume may be made and compared to the predicted ticket submission volume, and the result of the comparison may be incorporated into the prediction engine to improve the performance of the prediction engine. In one example embodiment, the prediction engine may be a neural network, and the comparison may be used for backpropagation to adjust the coefficients in the neural network.

The prediction engine may be configured to use information from multiple tenants to predict performance improvements. To continue the time zone example above, the prediction engine can determine that different tenants are utilizing resources with different cyclical peak periods, and adjust the resource quotas accordingly. The prediction engine can make this determination by accessing real-time data that may not available to any single tenant in order to make more accurate predictions and improve the performance of the cloud service accordingly.

The customer support system may provide a configuration update or a resource allocation and apply it to the cloud service, which may improve the performance of the cloud service. The configuration update or resource allocation may be generated and communicated to the customer support system, or generated by the customer support system itself. In one example embodiment, the customer support system may use a database of updates that is indexed by the state information from the cloud service in order to generate a configuration update to be applied to the cloud service. To continue the email cloud service example embodiment described previously, the customer support system may respond to the cloud service exceeding the threshold of connections by increasing the quota for email connections by a fixed amount (for example, 20%), and limiting the number of such automatic increases to a fixed rate (for example, once per month). The customer support system may use the API in order to update the cloud service with this configuration change. To continue the customer support cloud service example embodiment described previously, the customer support system may respond to the customer support cloud service exceeding the rate of ticket submission by increasing the amount of disk space allocated for the customer support cloud service by a fixed amount (for example, 20%), and limiting the number of such automatic increases to a fixed rate (for example, once per month). The customer support system may use the API in order to update the cloud service with this resource allocation.

It may be advantageous to use a remote monitoring and management (RMM) system to implement the measurement of the state information, measurement of resource utilization, update of state information, and update of resource allocation of the cloud service. In one example embodiment, an RMM system designed, constructed or manufactured by LABTECH of Tampa, Fla. may be used for these functions. In one embodiment, the RMM system may be able to perform these measurement and control operations by communicating directly with an API for the cloud service itself. In one embodiment, the RMM system may be able to perform these measurement and control operations using an API to the hypervisor that is managing the virtual machine where the cloud service is running. In one embodiment, the RMM system may be able to perform these measurement and control operations using a local agent that is running on the virtual machine. The local agent can be in communication with the RMM system to receive commands and data from the RMM system, and return status and data to the RMM system. In an example embodiment, the LABTECH RMM system can install a local agent on the virtual machine running the cloud service, and can use the local agent to read the state information of the virtual machine that represents state information of the cloud service, measure the resource usage of the virtual machine that represents the resource usage of the cloud service, update the state information of the virtual machine that controls the state of the cloud service, and update the operating system of the virtual machine to control the resource allocation for the cloud service. For example, the local agent may interact with the WINDOWS registry to measure and control state, and it may interact with the WINDOWS operating system API to measure resource utilization and control resource related allocation. In one embodiment, the local agent can be in communication with the RMM system indirectly through a remote agent that is running on a second machine; the second machine may be a virtual machine that uses the same physical machine as the cloud service, a second physical machine, or a virtual machine on a second physical machine. In one embodiment, the RMM may implement the measurement and control operations using a script. In an example embodiment, the RMM system may be running LABTECH scripts.

Notifications and alerts generated by the support system may be generated as a result of a variety of conditions. In one embodiment, the creation of a support ticket may always generate an alert or notification. To continue the email cloud service example embodiment described previously, if the state information of the email cloud service indicates that email is not available at all, simply creating this support ticket may indicate that a notification or alert should be generated for the support ticket, since the ticket may represent an urgent, high priority situation. In one embodiment, the creation of a support ticket may only generate an alert or notification if a value in the support ticket exceeds a limit that is set for the cloud service. To continue the email cloud service example embodiment described previously, if the state information of the email cloud service indicates the number of current connections to the email system, it may be desirable to enter a support ticket if the number exceeds a fraction (such as 90%) of the limit on connections, as described previously, but only generate an alert or notification if the number exceeds the full limit. In this way, the customer support system notes the fact that the usage is getting high, but the alert or notification is only generated in the more urgent situation where a customer cannot use the email system due to the limit. In one embodiment, the creation of a support ticket may only generate an alert or notification if a threshold is exceeded, either by the creation of the support ticket itself or by the data in the support ticket. To continue the customer support cloud service example embodiment described previously, it may be desirable to enter a support ticket if the rate of ticket submission exceeds a threshold (such as 100 per hour), as described previously, but only generate an alert or notification if the rate exceeds the threshold for more than a certain number (say 3) hours in a row. In this way, the customer support system notes the fact that the usage is getting high, but the alert or notification is only generated when this appears to be a sustained trend.

Updates to the cloud service can be used to repair operational issues in the cloud service. A predictive engine can be used to learn and generate repairs for new operational issues that arise in the cloud service. State information and an event stream from the cloud service can be used to query a database to return an operational status. If the operational status indicates an issue, the database can also return a set of repair steps if one is known. In parallel, a predictive engine can be used to return an operational status, a set of repair steps, and a confidence level. The predictive engine can be trained on the same data used to populate the database. If the predictive engine provides repair steps that are not available in the database, and the confidence level is above a threshold, the repair steps from the predictive engine can be used. A script generator can use the repair steps to generate a script to be applied to the cloud service, and a description of the repair to be recorded through an API in a customer support system. After the repair script is applied to the cloud service, the state information and event stream from the cloud service can be applied to the database to verify that no known issues are detected, and the success of the repair can be recorded in the customer support system using the API.

In one embodiment, the state information can be a vector of every setting that can be changed for the cloud service, and the event stream can be an unordered set of the last few (for example, 10) filtered events that were generated by the cloud service. The filtered events can be warning and error level events containing an event code and a small number (for example, 3) of parameters describing the event. The state vector and event set can be combined to make a query vector for the database and a set of input variable values for a prediction engine made from a neural network. The database can have entries that match the query using ranges and "don't cares" on some entries in the vector. The repair steps can be a small number (for example, 20) of steps that include an operation code and a small number (for example, 3) of parameters for the operation code. The predictive engine can be updated using backpropagation with the result of the database query.

In an illustrative example embodiment, the cloud service being monitored can be the SKYPE FOR BUSINESS cloud service that is used for chat and video conferencing. A known problem is one of saturation of the network channel, which happens when a threshold is exceeded for the number of video conference participants at a site (tenant). The video conference clients will eventually detect the issue and increase the video compression ratio (reduce the video quality) to adapt, but a better repair step for the issue can be to increase the default compression ratio globally for the tenant immediately, avoiding the interruptions that are likely to occur during the dynamic adaptation process. The database can recognize this with a query that detects the total number of participants exceeding the threshold, and can supply the repair step of increasing the compression ratio. The database can contain several rules with varying participant numbers and corresponding compression ratios, and the thresholds can be computed using the total bandwidth allocated for the site, which can also be state information in the query vector. It may be the case that in normal operation, saturation of the network channel always happens shortly after the engineering manager starts a status call with all the developers, because they all join the call within the next 5 minutes. The predictive engine can learn this association through the backpropagation and can eventually begin to predict the use of the repair steps to increase the compression ratio when the event stream shows a conference call starting by the engineering manager. Once this successfully avoids the saturation of the network channel, this entry may be added to the database for regular use in the future. The success can be recorded in the customer support database where it can be communicated to the customer.

Turning to the drawings, FIG. 1 is an illustrative block diagram of an example embodiment of a system for updating the configuration of a cloud service and communicating with a customer support system. The system can be referred to as a service configuration system ("SCS") 100. The cloud service 101 (e.g., executed by cloud 608 depicted in FIG. 6B) can provide services to an end user 103 (e.g., a client device 102a-n depicted in FIGS. 6A-6B) who can access it using a network (e.g., network 604 depicted in FIG. 6A). The cloud service 101 can run on a server (e.g., server 606a-n depicted in FIG. 6A) that is accessible to the end user 103. The cloud service 101 can contain state information 102 that can store control parameters that control the operation of the cloud service 101 and can also store data that indicates the results of the operation of the cloud service 101. A collector 104 can communicate with the cloud service 101 and the state information 102 to collect state 105 about the cloud service 101. The decision logic 106 can use the collected state 105 to directly prepare a configuration update 112 to be applied to the cloud service 101 or the state information 102. The resulting collected state 105 can also be used by decision logic 106 to interface with a customer support system 108 through a support API 107. The support API can communicate directly with the customer support system 108 and in this way, can create a new support ticket 109 or update an existing support ticket 110. The decision logic 106 can use the support API 107 along with the collected state 105 to create a new ticket 109 or update an existing ticket 110 with information from the collected state 105. The ticket 109 or 110 may be a result of a configuration update 112 generated by the decision logic 106. The customer support system 108 can also generate a configuration update 112 and use the support API 107 to apply the configuration update 112 to the cloud service 101 or the state information 102. The cloud service 101 can also update the state information 102 directly. This configuration update 112 may improve the performance of the cloud service 101 as a result. The customer support system 108 can generate a notification 111 based on a new ticket 109 or an existing ticket 110, and the notification 111 can be sent to the end user 103.

In some embodiments, the one or more servers (e.g., servers 606a-n depicted in FIG. 6A) associated with the cloud service 101 (e.g., cloud 608 depicted in FIG. 6B), decision logic 106, support API 107, customer support system 108, or notification 111 may not be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection. The servers may not be physically accessible, for example, they may be in outer space or on the bottom of the ocean.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server (e.g., server 606) may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The network (e.g., network 604) can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include one or more of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

To continue the email cloud service example embodiment described previously, the cloud service 101 can provide email cloud services to the end user 103 or client device 103.

The state information 102 for the cloud service 101 can include the measurement of the number of active connections (e.g., network connections) to the email cloud service 101 by end users 103. In one embodiment, the collector 104 can collect the number of active connections from the state information 102 into the collected state 105, the decision logic 106 can determine that the number of active connections to the email cloud service 101 exceeds a threshold of 90% of the allocated quota for connections, and this may happen more frequently than a threshold rate of 3 times in 1 hour. The decision logic 106 can determine that a reasonable modification is to increase the connection quota by 20% but to also notify the customer, and generate a support ticket to review the modification. As a result, the decision logic 106 can use the support API 107 along with the collected state 105 to generate a configuration update 112 to increase the connection quota, and generate a new ticket 109 in the customer support system 108 indicating the fact that the 90% threshold has been exceeded 3 times in 1 hour, along with information about the tenant (customer) that is affected, the number of connections that were observed, the allocation of connection resources, the times when the connections exceeded the threshold, the overall performance of the physical machine at that time, the increase of 20% that was applied, and so on. If an existing ticket 110 for this tenant and condition is already in the customer support system 108, it may be preferable to update the existing ticket 110 with this additional information, rather than creating a new ticket 109. The customer support system 108 can generate a notification 111 to the end user 103. Upon review of the ticket 109 or 110, a customer support representative may discuss the situation with the end user 103. The end user may decide to only increase the connection quota by 10% and the customer support representative may update the ticket 110. As a result, the support API 107 may generate a new configuration update 112 from the ticket 110, which may then be applied to the cloud service 101 or state information 102 to adjust the cloud service parameter to the value desired by the end user 103.

To continue the customer support cloud service example embodiment described previously, note that there are two customer support systems involved: the business support system (not illustrated) used by the customer to support the business (the travel agent or accounting firm in the example), and the customer support system 108 used to support an end user 103 at that customer. The business support system and the customer support system 108 may be the same or different support systems, and may be running on the same or different physical or virtual machines. The cloud service 101 can provides services for running the business support system for the end user 103, and can include state information 102 that may contain information about when each ticket is submitted to the business support system. The collector 104 may retrieve the ticket submission times and store them in the collected state 105. The decision logic may determine that the ticket submission volume exceeds a threshold of 100 tickets per hour, which may indicate a likely customer support situation, and as a result, the decision logic 106 can use the support API 107 along with the collected state 105 to generate a new ticket 109 in the customer support system 108 indicating the fact that the threshold of 100 tickets per hour has been exceeded, along with information about the tenant (customer) that is affected, the number of tickets per hour that were created, the sources of the ticket creation, the overall performance of the physical machine, and so on. If an existing ticket 110 for this tenant and condition is already in the customer support system 108, it may be preferable to update the existing ticket 110 with additional information, rather than creating a new ticket 109.

The customer support system 108 may be able to generate a notification 111 for an end user 103 based on the new ticket 109 or an existing ticket 110. To continue the email cloud service example embodiment described previously, it may be desirable to alert an end user 103 that the threshold of 90% of the allocated quota for connections has been exceeded more than 3 times in 1 hour. The end user 103 may be a customer service representative, a customer, or any other interested party. Multiple end users 103 may be notified, and the notification 111 may use multiple channels, such as text message, email, voice message, social media posting, chat, and so on.

The system and its components, such as a cloud service 101, decision logic 106, support API 107, customer support system 108, and notification 111, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a cloud service 101, decision logic 106, support API 107, customer support system 108, and notification 111, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In some embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
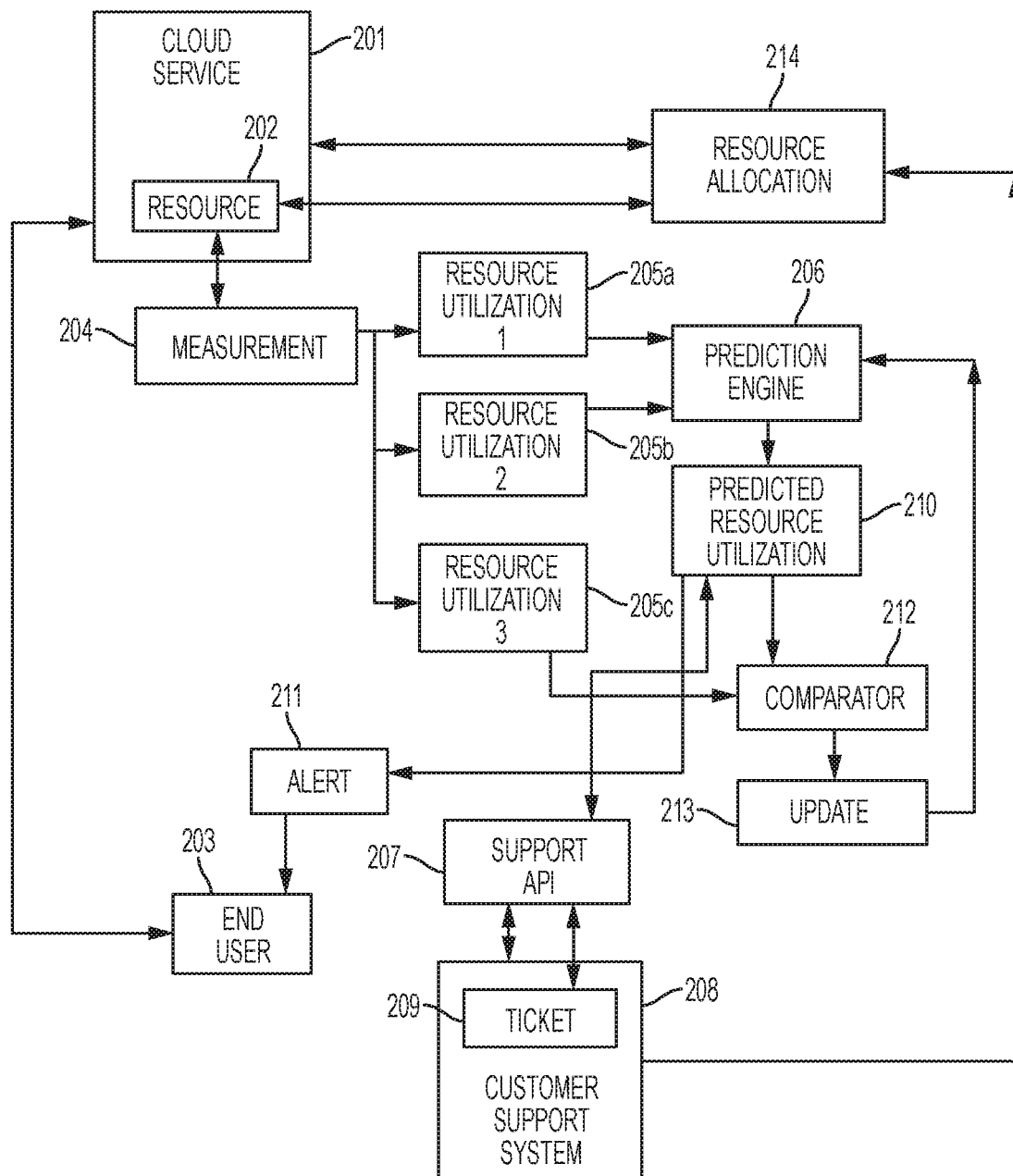
FIG. 2 is an illustrative block diagram of an example embodiment of a system for updating the resource allocation of a cloud service, using a prediction engine for resource utilization, and communicating with a customer support system.

FIG. 2 is an illustrative block diagram of an example embodiment of a system for updating the resource allocation of a cloud service, using a prediction engine for resource utilization, and communicating with a customer support system. The cloud service 201 can provide services to an end user 203 who can access it using a network. The cloud service 201 can run on a server that is accessible to the end user 203. The cloud service 201 can utilize resources 202 to provide services to the end user 203, and the resources 202 can be controlled either directly by a resource allocation 214 or indirectly through the cloud service 201 by the resource allocation 214. The resource utilization by the cloud service 201 can be measured by a measurement 204, and the resource utilization over time can be measured as separate measurements 205a-205c at different times. A prediction engine 206 can use resource utilization measurements 205a-205b from multiple times to arrive at a prediction 210 for the resource utilization, and can then compare 212 the prediction 210 with the actual resource utilization 205c at the predicted time. The results of the comparison 212 can be used to provide an update 213 to the prediction engine 206 to increase the accuracy of the prediction of the utilization of the resource 202. The prediction engine 206 may be implemented in numerous ways; in one embodiment the prediction engine 206 is a simple linear interpolation, and in another embodiment the prediction engine 206 is a neural network that may have hidden stages, and the update 213 is a backpropagation. The output of the prediction 210 can be used to generate an alert or notification 211 for the end user 203, and can also be used to access a support API 207 to generate or update a ticket 209 in a customer support system 208. The customer support system 208 can also directly generate a resource allocation 214 to be applied to either the cloud service 201 or the resources 202 as previously described.

To continue the email cloud service example embodiment described previously, the cloud service 201 can provide email cloud services to the end user 203. The resource 202 for the cloud service can be the number of active connections to the email cloud service 201 by end users 203. The measurement 204 can record the number of active connections over time 205a-205b, and the prediction engine can use recorded measurements 205a-205b to predict the number of active connections 210, compare it 212 with the actual number of active connections 205c, and update 213 the prediction engine 206 with the result of the comparison 212. When the prediction engine 206 arrives at a prediction 210 indicating that the number of active connections is likely to exceed the maximum allowed number, the system can use an alert 211 to notify the end user 203, and can also enter or modify a ticket 209 in the customer support system 208 with information about the tenant (customer) that is affected, the number of connections that were observed, the allocation of connection resources, the times when the connections exceeded the threshold, the overall performance of the physical machine at that time, and so on. The customer support system 208 can provide an increase in the maximum number of allowed connections and use the resource allocation 214 to implement this increase.

Figure 3:
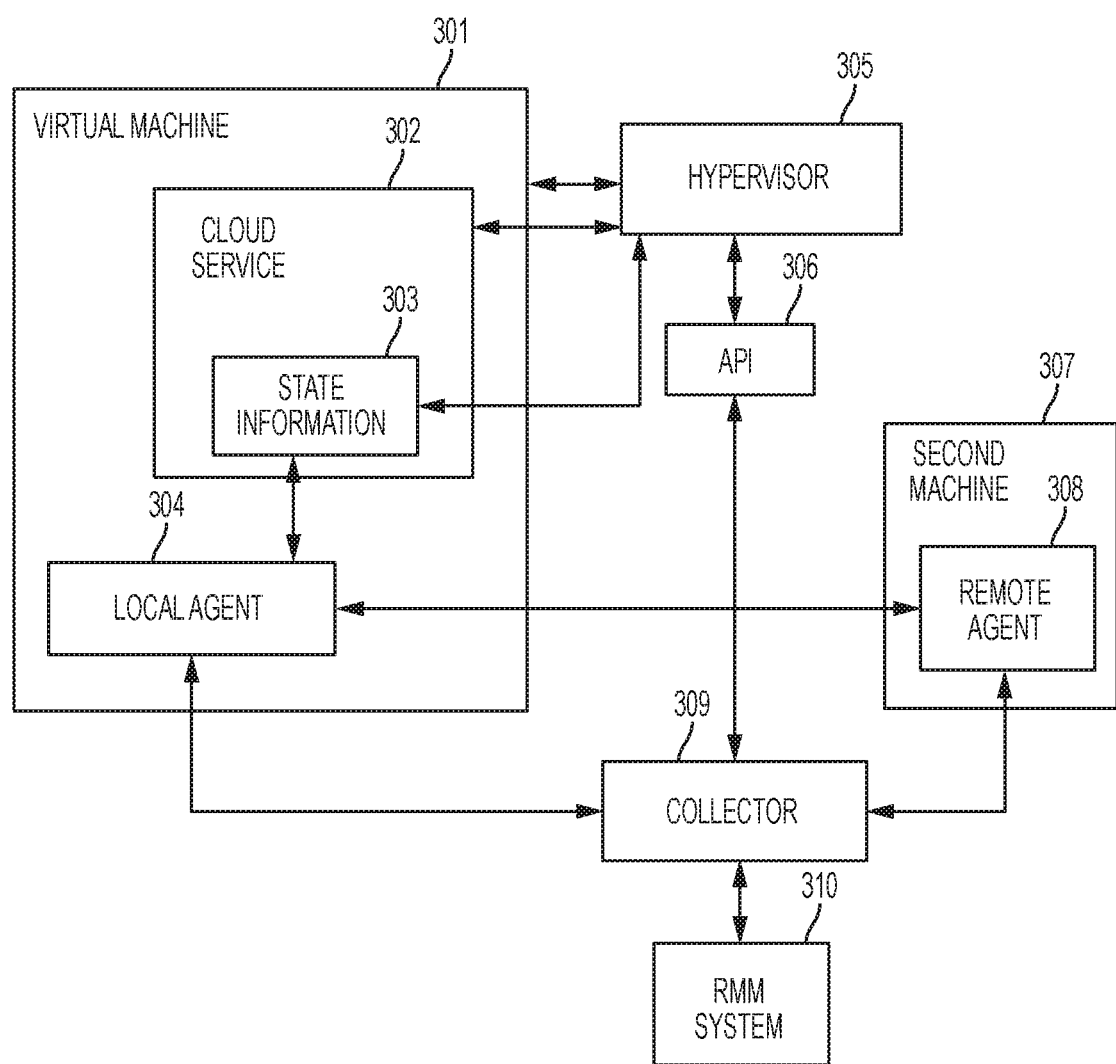
FIG. 3 is an illustrative block diagram of an example embodiment of a system for collecting state information and resource utilization of a cloud service using a remote monitoring and management (RMM) system.

FIG. 3 is an illustrative block diagram of an example embodiment of a system for collecting state information and resource utilization of a cloud service using a remote monitoring and management (RMM) system. A cloud service 302 running on a virtual machine 301 may allow even more fine grained control over the measurement and update of state information 303 for the cloud service 302, which can include control information for the cloud service 302. The hypervisor 305 of the virtual machine 301 may have direct access to the memory and storage of the cloud service 302 or the state information 303 itself, and may have access to the operating system of the virtual machine 301 that controls many of the operational aspects of the cloud service 302. A collector 309 that is monitoring the cloud service 302 can then have access to the hypervisor 305 through an API 306. Additionally, a remote monitoring and management (RMM) system 310 may install a local agent 304 on the virtual machine. The local agent 304 can run as a separate process on the virtual machine 301 and may have access to the cloud service 302, the state information 303, and the operating system of the virtual machine 301, in much the same way as the hypervisor 305. For example, the local agent 304 can include or refer to a software agent, computer program, or bot that acts for a user or other program. However, since the local agent 304 is running as a process inside the virtual machine 301, it may have some capabilities that are more complete or more convenient than those of the hypervisor 305. Accordingly, the collector 309 may be able to retrieve additional useful information about the cloud service 302, or even control the cloud service 302, through the local agent 304 under the direction of the RMM system 310. It may be that direct access to the local agent 304 is difficult or impossible, for example, due to security concerns, but it may be reasonable to access the local agent 304 from another instance of the agent that acts as a remote agent 308 running on a second machine 307. In this case, the collector may be able to retrieve additional useful information about the cloud service 302, or even control the cloud service 302, through the remote agent 308 running on the second machine 307, under the direction of the RMM system 310. For example, the remote agent 308 can include or refer to a software agent, computer program, or bot that acts for a user or other program.

Figure 4:
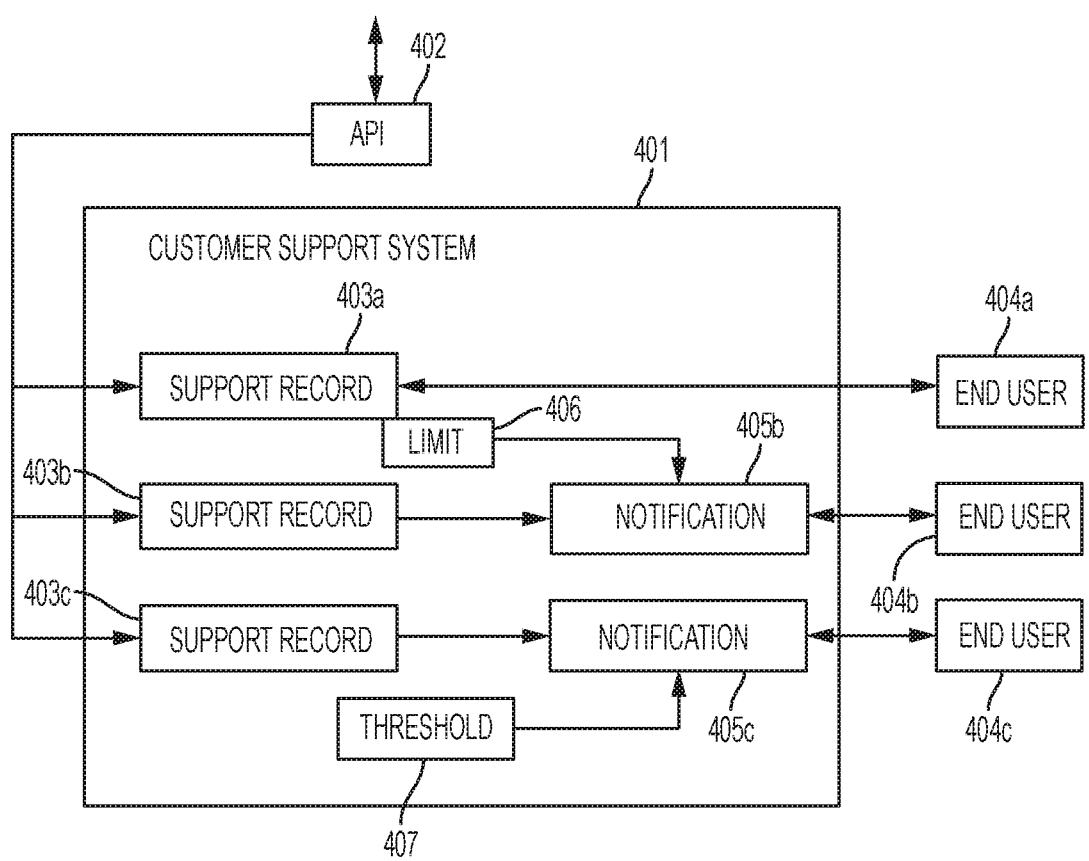
FIG. 4 is an illustrative block diagram of an example embodiment of a system for generating notifications for end users by a customer support system.

FIG. 4 is an illustrative block diagram of an example embodiment of a system for generating notifications for end users by a customer support system. The customer support system 401 may have different types of support records 403a-403c. Support record 403a may indicate a condition where a limit 406 has been reached, but the limit 406 may not be modified without approval by the end user 404a. If the end user 404a approves modification of the limit 406 to resolve the condition indicated in support record 403a, the support record 403a can be updated with the new limit 406 and the API 402 can be used to update the appropriate operational limit. Examples of this have been previously described with respect to FIG. 1 and FIG. 2. Support record 403b may indicate a condition where a limit 406 has been reached, and a modification of the limit 406 is preapproved in order to resolve the condition. In this case, a notification 405b with information about the condition described in 403b, the limit 406, and the update to be applied can be sent to the end user 404b, the limit 406 can be updated, and the API 402 can be used to update the appropriate operational limit. Examples of this have been previously described with respect to FIG. 1 and FIG. 2. Support record 403c may indicate a condition where a threshold 407 has been encountered, and a somewhat more complicated resolution is required. A notification 405c can be generated for the end user 404c describing the condition, the detection threshold, and the remedy to be applied, the remedy can be updated to the support record 403c, and the API 402 can be used to apply the remedy to the affected system.

Figure 5:
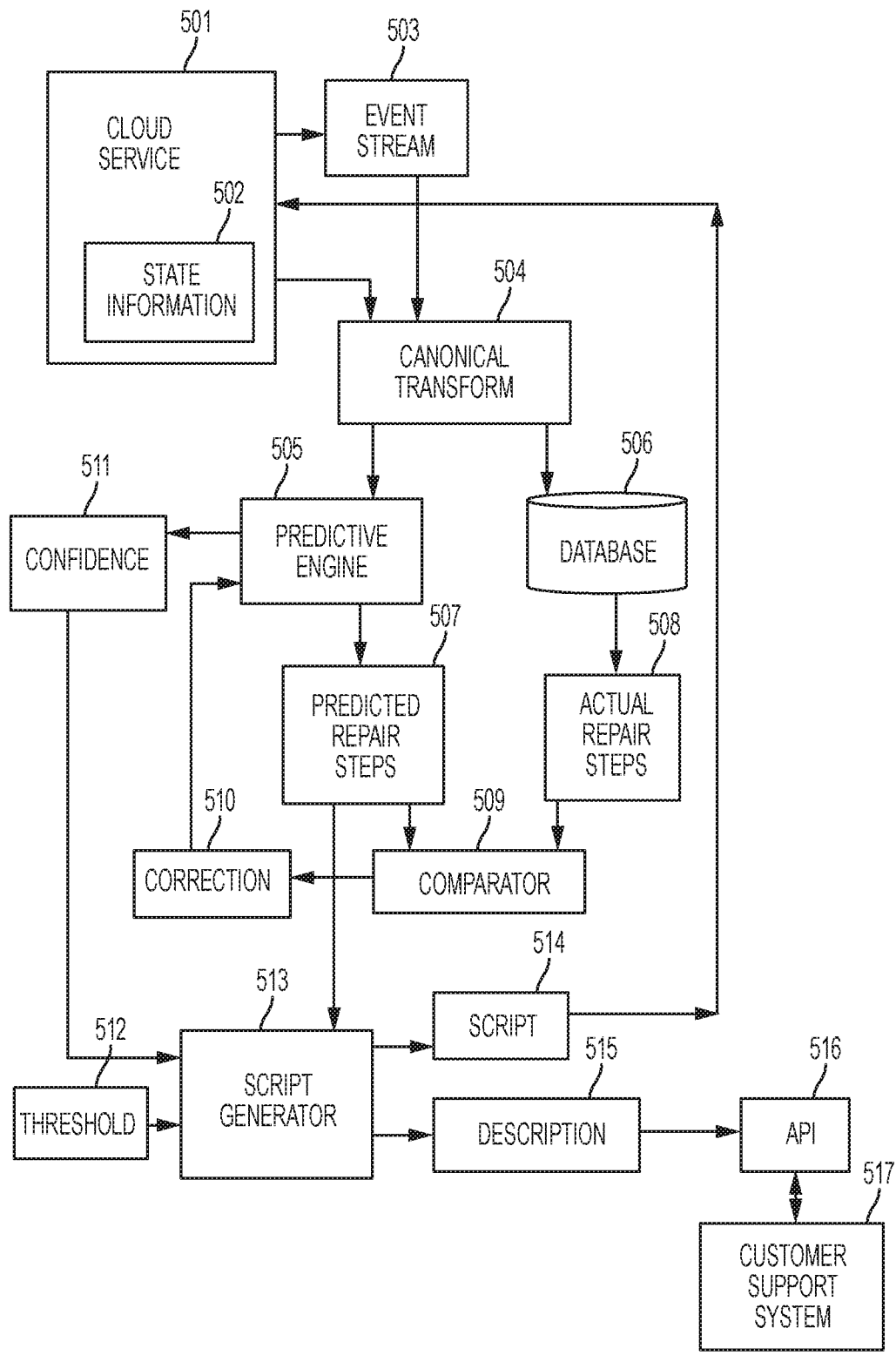
FIG. 5 is an illustrative block diagram of an example embodiment of a system for applying a script to a cloud service to correct an operational issue of the cloud service.

FIG. 5 is an illustrative block diagram of an example embodiment of a system for applying a script to a cloud service to correct an operational issue of the cloud service. A cloud service 501 can be monitored for its current state information 502 as well as an event stream 503 of events that are generated or detected by the cloud service 501. A canonical transform 504 can use the state information 502 and event stream 503 to produce a filtered event stream that presents similar output for similar exception conditions. For example, the canonical transform 504 may filter out events that are unrelated to an event in progress, and it may reorder the events in time to appear in the same sequence even if timing variations have changed the timing of their actual occurrence. The output from the canonical transformation 504 can be used to index a database 506 of known problems and solutions. In parallel, the output of the canonical transform can be used as an input to a predictive engine 505, and the predictive engine 505 can be trained by comparing 509 its predictions 507 with the results 508 from the database, using the comparison 509 to generate a correction 510, and applying the correction to the predictive engine 505. As a side effect, the predictive engine 505 can generate a confidence estimate 511 on its predicted repair 507, and when the confidence estimate 511 is above a threshold 512, a script generator 513 can be used to process the repair steps 507. The script generator 513 can generate a machine-readable script 514 that can be applied to the cloud service 501 to resolve the issue, and can also generate a human-readable description 515 that can be used to create or update an entry in the customer support system 517 through an API 516.

Figure 6A:
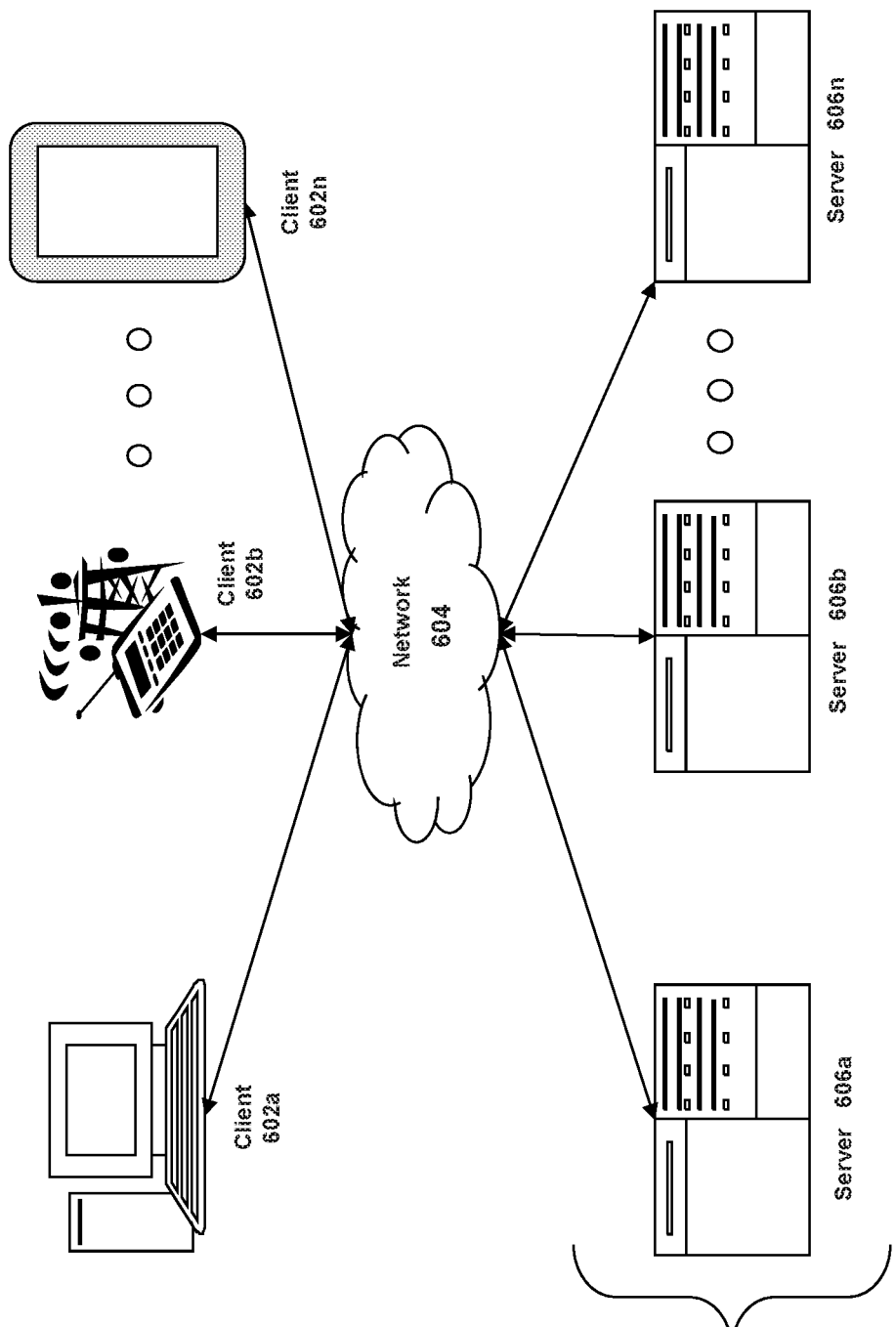
FIG. 6A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 6A, an embodiment of a network environment is depicted. In brief overview, the network environment includes one or more clients 602a-602n (also generally referred to as local machine(s) 602, client(s) 602, client node(s) 602, client machine(s) 602, client computer(s) 602, client device(s) 602, endpoint(s) 602, or endpoint node(s) 602) in communication with one or more servers 606a-606n (also generally referred to as server(s) 606, node 606, or remote machine(s) 606) via one or more networks 604. In some embodiments, a client 602 has the capacity to function as both a client node seeking access to resources provided by a server and as a server providing access to hosted resources for other clients 602a-602n.

Although FIG. 6A shows a network 604 between the clients 602 and the servers 606, the clients 602 and the servers 606 may be on the same network 604. In some embodiments, there are multiple networks 604 between the clients 602 and the servers 606. In one of these embodiments, a network 604' (not shown) may be a private network and a network 604 may be a public network. In another of these embodiments, a network 604 may be a private network and a network 604' a public network. In still another of these embodiments, networks 604 and 604' may both be private networks.

The network 604 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 604 may be any type and/or form of network. The geographical scope of the network 604 may vary widely and the network 604 can be a body area network (BAN), a personal area network (PAN), a local-area network (LAN), e.g. Intranet, a metropolitan area network (MAN), a wide area network (WAN), or the Internet. The topology of the network 604 may be of any form and may include, e.g., any of the following: point-to-point, bus, star, ring, mesh, or tree. The network 604 may be an overlay network which is virtual and sits on top of one or more layers of other networks 604'. The network 604 may be of any such network topology as known to those ordinarily skilled in the art capable of supporting the operations described herein. The network 604 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 604 may be a type of a broadcast network, a telecommunications network, a data communication network, or a computer network.

In some embodiments, the system may include multiple, logically-grouped servers 606. In one of these embodiments, the logical group of servers may be referred to as a server farm 38 or a machine farm 38. In another of these embodiments, the servers 606 may be geographically dispersed. In other embodiments, a machine farm 38 may be administered as a single entity. In still other embodiments, the machine farm 38 includes a plurality of machine farms 38. The servers 606 within each machine farm 38 can be heterogeneous—one or more of the servers 606 or machines 606 can operate according to one type of operating system platform (e.g., WINDOWS NT, manufactured by Microsoft Corp. of Redmond, Wash.), while one or more of the other servers 606 can operate on according to another type of operating system platform (e.g., Unix, Linux, or Mac OS X).

In one embodiment, servers 606 in the machine farm 38 may be stored in high-density rack systems, along with associated storage systems, and located in an enterprise data center. In this embodiment, consolidating the servers 606 in this way may improve system manageability, data security, the physical security of the system, and system performance by locating servers 606 and high performance storage systems on localized high performance networks. Centralizing the servers 606 and storage systems and coupling them with advanced system management tools allows more efficient use of server resources.

The servers 606 of each machine farm 38 do not need to be physically proximate to another server 606 in the same machine farm 38. Thus, the group of servers 606 logically grouped as a machine farm 38 may be interconnected using a wide-area network (WAN) connection or a metropolitan-area network (MAN) connection. For example, a machine farm 38 may include servers 606 physically located in different continents or different regions of a continent, country, state, city, campus, or room. Data transmission speeds between servers 606 in the machine farm 38 can be increased if the servers 606 are connected using a local-area network (LAN) connection or some form of direct connection. Additionally, a heterogeneous machine farm 38 may include one or more servers 606 operating according to a type of operating system, while one or more other servers 606 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 606 may comprise components, subsystems and modules to support one or more management services for the machine farm 38. In one of these embodiments, one or more servers 606 provide functionality for management of dynamic data, including techniques for handling failover, data replication, and increasing the robustness of the machine farm 38. Each server 606 may communicate with a persistent store and, in some embodiments, with a dynamic store.

Server 606 may be a file server, application server, web server, proxy server, appliance, network appliance, gateway, gateway server, virtualization server, deployment server, SSL VPN server, or firewall. In one embodiment, the server 606 may be referred to as a remote machine or a node. In another embodiment, a plurality of nodes 290 may be in the path between any two communicating servers.

Figure 6B:
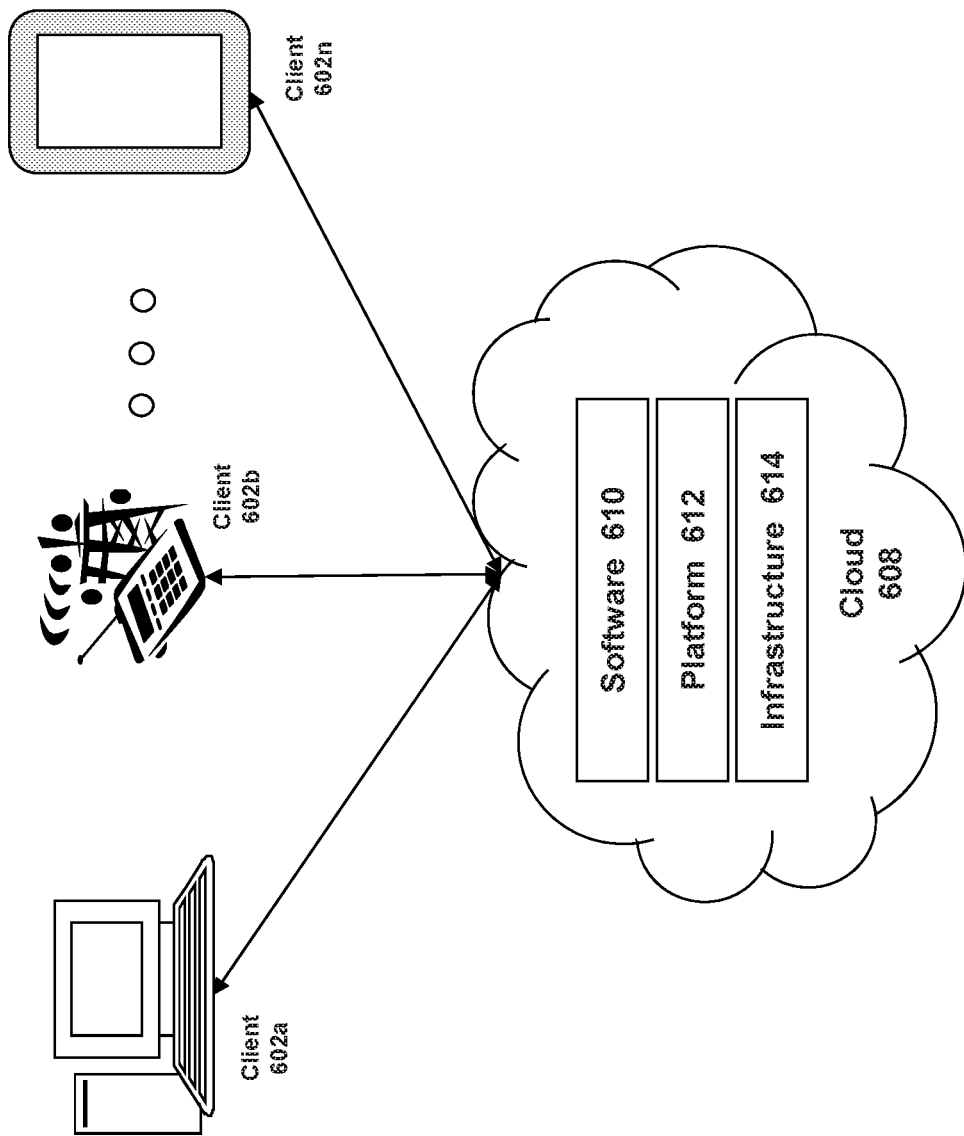
FIG. 6B is a block diagram depicting a cloud computing environment comprising client device in communication with cloud service providers.

Referring to FIG. 6B, a cloud computing environment is depicted. A cloud computing environment may provide client 602 with one or more resources provided by a network environment. The cloud computing environment may include one or more clients 602a-602n, in communication with the cloud 608 over one or more networks 604. Clients 602 may include, e.g., thick clients, thin clients, and zero clients. A thick client may provide at least some functionality even when disconnected from the cloud 608 or servers 606. A thin client or a zero client may depend on the connection to the cloud 608 or server 606 to provide functionality. A zero client may depend on the cloud 608 or other networks 604 or servers 606 to retrieve operating system data for the client device. The cloud 608 may include back end platforms, e.g., servers 606, storage, server farms or data centers.

The cloud 608 may be public, private, or hybrid. Public clouds may include public servers 606 that are maintained by third parties to the clients 602 or the owners of the clients. The servers 606 may be located off-site in remote geographical locations as disclosed above or otherwise. Public clouds may be connected to the servers 606 over a public network. Private clouds may include private servers 606 that are physically maintained by clients 602 or owners of clients. Private clouds may be connected to the servers 606 over a private network 604. Hybrid clouds 608 may include both the private and public networks 604 and servers 606.

The cloud 608 may also include a cloud based delivery, e.g. Software as a Service (SaaS) 610, Platform as a Service (PaaS) 612, and Infrastructure as a Service (IaaS) 614. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 602 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 602 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 602 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 602 may also access SaaS resources through smartphone or tablet applications, including, e.g., Salesforce Sales Cloud, or Google Drive app. Clients 602 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 6C:
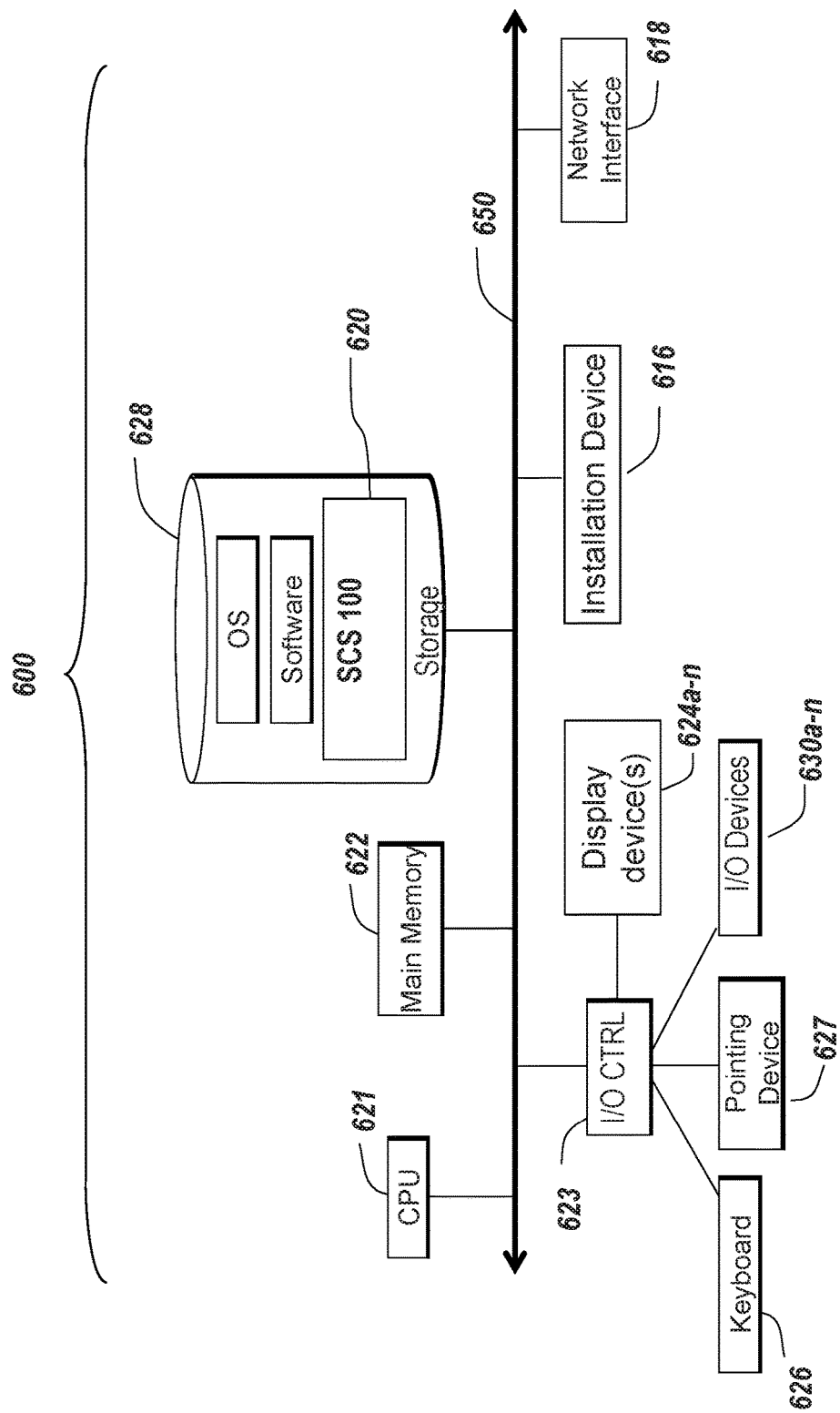
FIGS. 6C and 6D are block diagrams depicting embodiments of computing devices useful in connection with the methods and systems described herein.
Figure 6D:
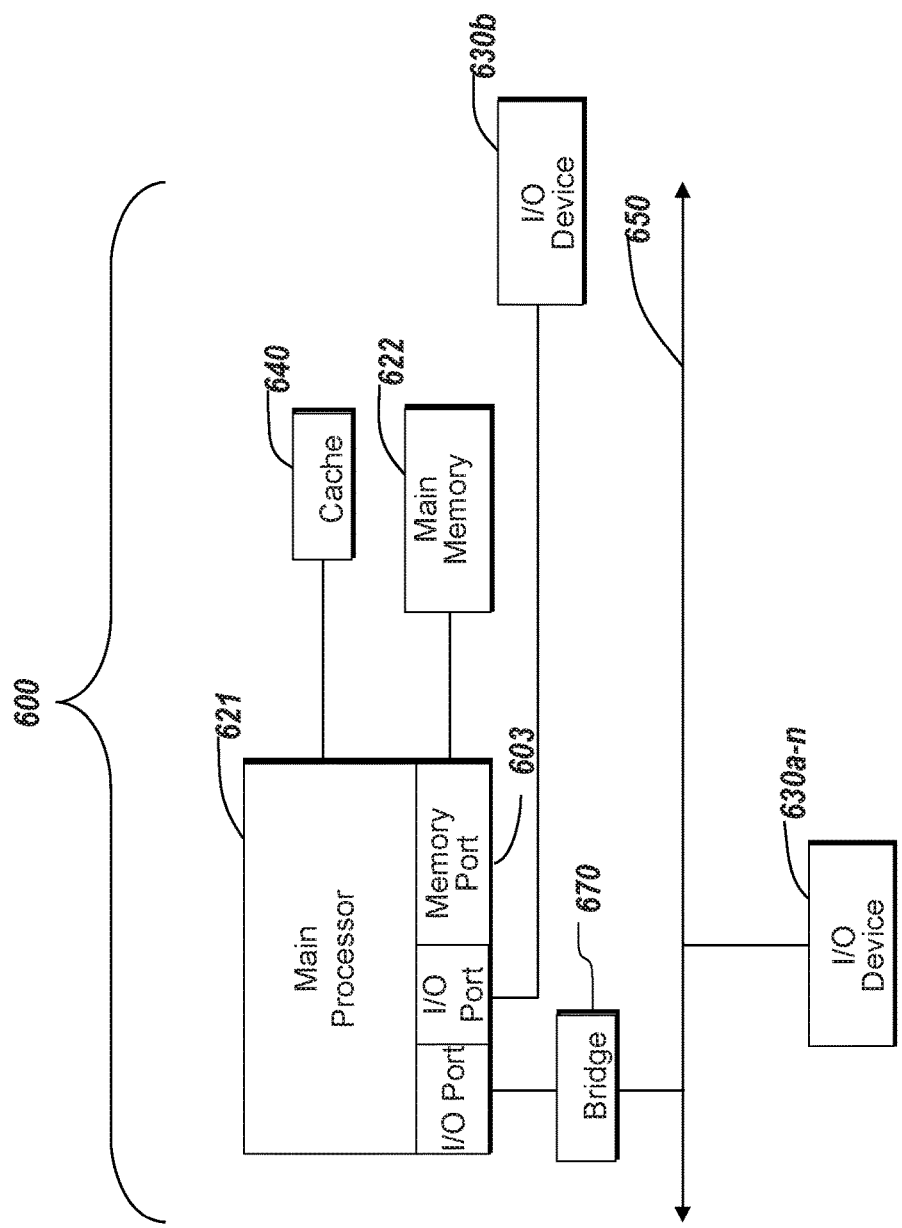

The client 602 and server 606 may be deployed as and/or executed on any type and form of computing device, e.g. a computer, network device or appliance capable of communicating on any type and form of network and performing the operations described herein. FIGS. 6C and 6D depict block diagrams of a computing device 600 useful for practicing an embodiment of the client 602 or a server 606. As shown in FIGS. 6C and 6D, each computing device 600 includes a central processing unit 621, and a main memory unit 622. As shown in FIG. 6C, a computing device 600 may include a storage device 628, an installation device 616, a network interface 618, an I/O controller 623, display devices 624a-624n, a keyboard 626 and a pointing device 627, e.g. a mouse. The storage device 628 may include, without limitation, an operating system, software, and a software of or associated with SCS 100. As shown in FIG. 6D, each computing device 600 may also include additional optional elements, e.g. a memory port 603, a bridge 670, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 600 may be based on any of these processors, or any other processor capable of operating as described herein. The central processing unit 621 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 622 may include one or more memory chips capable of storing data and allowing any storage location to be directly accessed by the microprocessor 621. Main memory unit 622 may be volatile and faster than storage 628 memory. Main memory units 622 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 622 or the storage 628 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 622 may be based on any of the above described memory chips, or any other available memory chips capable of operating as described herein. In the embodiment shown in FIG. 6C, the processor 621 communicates with main memory 622 via a system bus 650 (described in more detail below). FIG. 6D depicts an embodiment of a computing device 600 in which the processor communicates directly with main memory 622 via a memory port 603. For example, in FIG. 6D the main memory 622 may be DRDRAM.

FIG. 6D depicts an embodiment in which the main processor 621 communicates directly with cache memory 640 via a secondary bus, sometimes referred to as a backside bus. In other embodiments, the main processor 621 communicates with cache memory 640 using the system bus 650. Cache memory 640 typically has a faster response time than main memory 622 and is typically provided by SRAM, BSRAM, or EDRAM. In the embodiment shown in FIG. 6D, the processor 621 communicates with various I/O devices 630 via a local system bus 650. Various buses may be used to connect the central processing unit 621 to any of the I/O devices 630, including a PCI bus, a PCI-X bus, or a PCI-Express bus, or a NuBus. For embodiments in which the I/O device is a video display 624, the processor 621 may use an Advanced Graphics Port (AGP) to communicate with the display 624 or the I/O controller 623 for the display 624. FIG. 6D depicts an embodiment of a computer 600 in which the main processor 621 communicates directly with I/O device 630b or other processors 621' via HYPERTRANSPORT, RAPIDIO, or INFINIBAND communications technology. FIG. 6D also depicts an embodiment in which local busses and direct communication are mixed: the processor 621 communicates with I/O device 630a using a local interconnect bus while communicating with I/O device 630b directly.

A wide variety of I/O devices 630a-630n may be present in the computing device 600. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 630a-630n may include a combination of multiple input or output devices, including, e.g., Microsoft KINECT, Nintendo Wiimote for the WII, Nintendo WII U GAMEPAD, or Apple IPHONE. Some devices 630a-630n allow gesture recognition inputs through combining some of the inputs and outputs. Some devices 630a-630n provides for facial recognition which may be utilized as an input for different purposes including authentication and other commands. Some devices 630a-630n provides for voice recognition and inputs, including, e.g., Microsoft KINECT, SIRI for IPHONE by Apple, Google Now or Google Voice Search.

Additional devices 630a-630n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 630a-630n, display devices 624a-624n or group of devices may be augment reality devices. The I/O devices may be controlled by an I/O controller 623 as shown in FIG. 6C. The I/O controller may control one or more I/O devices, such as, e.g., a keyboard 626 and a pointing device 627, e.g., a mouse or optical pen. Furthermore, an I/O device may also provide storage and/or an installation medium 616 for the computing device 600. In still other embodiments, the computing device 600 may provide USB connections (not shown) to receive handheld USB storage devices. In further embodiments, an I/O device 630 may be a bridge between the system bus 650 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 624a-624n may be connected to I/O controller 623. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 624a-624n may also be a head-mounted display (HMD). In some embodiments, display devices 624a-624n or the corresponding I/O controllers 623 may be controlled through or have hardware support for OPENGL or DIRECTX API or other graphics libraries.

In some embodiments, the computing device 600 may include or connect to multiple display devices 624a-624n, which each may be of the same or different type and/or form. As such, any of the I/O devices 630a-630n and/or the I/O controller 623 may include any type and/or form of suitable hardware, software, or combination of hardware and software to support, enable or provide for the connection and use of multiple display devices 624a-624n by the computing device 600. For example, the computing device 600 may include any type and/or form of video adapter, video card, driver, and/or library to interface, communicate, connect or otherwise use the display devices 624a-624n. In one embodiment, a video adapter may include multiple connectors to interface to multiple display devices 624a-624n. In other embodiments, the computing device 600 may include multiple video adapters, with each video adapter connected to one or more of the display devices 624a-624n. In some embodiments, any portion of the operating system of the computing device 600 may be configured for using multiple displays 624a-624n. In other embodiments, one or more of the display devices 624a-624n may be provided by one or more other computing devices 600a or 600b connected to the computing device 600, via the network 604. In some embodiments software may be designed and constructed to use another computer's display device as a second display device 624a for the computing device 600. For example, in one embodiment, an Apple iPad may connect to a computing device 600 and use the display of the device 600 as an additional display screen that may be used as an extended desktop. One ordinarily skilled in the art will recognize and appreciate the various ways and embodiments that a computing device 600 may be configured to have multiple display devices 624a-624n.

Referring again to FIG. 6C, the computing device 600 may comprise a storage device 628 (e.g. one or more hard disk drives or redundant arrays of independent disks) for storing an operating system or other related software, and for storing application software programs such as any program related to the software 620 for the experiment tracker system. Examples of storage device 628 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 628 may be non-volatile, mutable, or read-only. Some storage device 628 may be internal and connect to the computing device 600 via a bus 650. Some storage device 628 may be external and connect to the computing device 600 via a I/O device 630 that provides an external bus. Some storage device 628 may connect to the computing device 600 via the network interface 618 over a network 604, including, e.g., the Remote Disk for MACBOOK AIR by Apple. Some client devices 600 may not require a non-volatile storage device 628 and may be thin clients or zero clients 602. Some storage device 628 may also be used as a installation device 616, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 600 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 602. An application distribution platform may include a repository of applications on a server 606 or a cloud 608, which the clients 602a-602n may access over a network 604. An application distribution platform may include application developed and provided by various developers. A user of a client device 602 may select, purchase and/or download an application via the application distribution platform.

Furthermore, the computing device 600 may include a network interface 618 to interface to the network 604 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 600 communicates with other computing devices 600' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 618 may comprise a built-in network adapter, network interface card, PCMCIA network card, EXPRESSCARD network card, card bus network adapter, wireless network adapter, USB network adapter, modem or any other device suitable for interfacing the computing device 600 to any type of network capable of communication and performing the operations described herein.

A computing device 600 of the sort depicted in FIGS. 6B and 6C may operate under the control of an operating system, which controls scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 600 has sufficient processor power and memory capacity to perform the operations described herein. In some embodiments, the computing device 600 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 600 is a gaming system. For example, the computer system 600 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 600 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 600 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 600 is a tablet e.g. the IPAD line of devices by Apple; GALAXY TAB family of devices by Samsung; or KINDLE FIRE, by Amazon.com, Inc. of Seattle, Wash. In other embodiments, the computing device 600 is a eBook reader, e.g. the KINDLE family of devices by Amazon.com, or NOOK family of devices by Barnes & Noble, Inc. of New York City, N.Y.

In some embodiments, the communications device 602 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 602 is a laptop or desktop computer equipped with a web browser and a microphone and speaker system, e.g. a telephony headset. In these embodiments, the communications devices 602 are web-enabled and can receive and initiate phone calls. In some embodiments, a laptop or desktop computer is also equipped with a webcam or other video capture device that enables video chat and video call.

In some embodiments, the status of one or more machines 602, 606 in the network 604 can be monitored as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. The computer-readable programs can be implemented in a programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures may be performed in any order. In certain embodiments, multitasking and parallel processing may be advantageous.

While this specification contains many specific implementation details, these should not be construed as limitations on the scope of any subject matter of what may be claimed, but rather as descriptions of features specific to particular implementations of the subject matter. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system to manage performance of cloud services, comprising:
   one or more processors retrieving instructions from memory and executing the retrieved instructions to:
      receive data packets comprising state information corresponding to one or more services provided by a cloud service accessed by a plurality of client devices;
      determine a characteristic of the cloud service based on the state information, the determined characteristic comprising a first resource utilization of the cloud service by a first client device of the plurality of client devices;
      generate a first electronic ticket based on the determined characteristic;
      select, based on a comparison of the first electronic ticket with a second electronic ticket, a type of configuration update for the cloud service, the second electronic ticket comprising a second resource utilization of the cloud service by a second client device of the plurality of client devices; and
      provide, responsive the first electronic ticket and selection of the type of configuration update, an indication to update the cloud service with a configuration update to manage performance of the cloud service.

2. The system of claim 1, comprising the one or more processors executing the retrieved instructions to determine the characteristic for the first client device of the plurality of client devices.

3. The system of claim 1, comprising the one or more processors executing the retrieved instructions to determine the characteristic for a first tenant of the cloud service, the first tenant associated with the first client device of the plurality of client devices.

4. The system of claim 1, comprising the one or more processors executing the retrieved instructions to:

generate the first electronic ticket for a first tenant of a plurality of tenants of the cloud service, the first tenant associated with the first client device; and generate the second electronic ticket for a second tenant of the plurality of tenants of the cloud service, the second tenant associated with the second client device.

5. The system of claim 1, wherein the one or more services of the cloud service are provided by at least one virtual machine.

6. The system of claim 1, wherein a first virtual machine provides a first instance of a service of the one or more services, and a second virtual machine provides a second instance of the service to a second tenant, comprising the one or more processors executing the retrieved instructions to generate the first electronic ticket for the first virtual machine, and the second electronic ticket for the second virtual machine.

7. The system of claim 1, wherein a virtual machine provides a first instance of a service of the one or more services to the first client device of the plurality of client devices, and the virtual machine provides a second instance of the service to the second client device of the plurality of client devices.

8. The system of claim 1, comprising the one or more processors executing the retrieved instructions to generate the first electronic ticket based on the characteristic indicating an error or that an amount of the first resource utilization is greater than a threshold.

9. The system of claim 1, comprising the one or more processors executing the retrieved instructions to:
measure the characteristic comprising the first resource utilization of the cloud service by the first client device; and
generate the indication for the configuration update based on the first resource utilization.

10. The system of claim 1, comprising the one or more processors executing the retrieved instructions to:
measure the first resource utilization of the cloud service by the first client device that accesses the cloud service;
measure the second resource utilization of the cloud service by the second client device that accesses the cloud service;
determine, based on the first resource utilization and the second resource utilization, a predicted resource utilization; and
generate an alert responsive to the predicted resource utilization greater than a threshold.

11. A method of managing performance of cloud services, comprising:
receiving, by one or more processors, data packets comprising state information corresponding to one or more services provided by a cloud service accessed by a plurality of client devices;
determining, by the one or more processors, a characteristic of the cloud service based on the state information, the determined characteristic comprising a first resource utilization of the cloud service by a first client device of the plurality of client devices;
generating, by the one or more processors, a first electronic ticket based on the determined characteristic;
selecting, by the one or more processors, based on a comparison of the first electronic ticket with a second electronic ticket, a type of configuration update for the cloud service, the second electronic ticket comprising a second resource utilization of the cloud service by a second client device of the plurality of client devices; and providing, by the one or more processors, responsive the first electronic ticket and selection of the type of configuration update, an indication to update the cloud service with a configuration update to manage performance of the cloud service.

12. The method of claim 11, comprising determining, by the one or more processors, the characteristic of the first client device of the plurality of client devices.

13. The method of claim 11, comprising determining, by the one or more processors, the characteristic for a first tenant of the cloud service, the first tenant associated with the first client device of the plurality of client devices.

14. The method of claim 11, comprising:
generating, by the one or more processors, the first electronic ticket for a first tenant of a plurality of tenants of the cloud service, the first tenant associated with the first client device; and
generating, by the one or more processors, the second electronic ticket for a second tenant of the plurality of tenants of the cloud service, the second tenant associated with the second client device.

15. The method of claim 11, wherein the one or more services of the cloud service are provided by at least one virtual machine.

16. The method of claim 11, wherein a first virtual machine provides a first instance of a service of the one or more services, and a second virtual machine provides a second instance of the service to a second tenant, comprising generating, by the one or more processors, the first electronic ticket for the first virtual machine, and the second electronic ticket for the second virtual machine.

17. The method of claim 11, wherein a virtual machine provides a first instance of a service of the one or more services to the first client device of the plurality of client devices, and the virtual machine provides a second instance of the service to the second client device of the plurality of client devices.

18. The method of claim 11, comprising generating, by the one or more processors, the first electronic ticket based on the characteristic indicating an error or that an amount of the first resource utilization is greater than a threshold.

19. The method of claim 11, comprising:
measuring, by the one or more processors, the characteristic comprising the first resource utilization of the cloud service by the first client device; and
generating, by the one or more processors, the indication for the configuration update based on the first resource utilization.

20. The method of claim 11, comprising:
measuring, by the one or more processors, the first resource utilization of the cloud service associated with the first client device that accesses the cloud service;
measuring, by the one or more processors, the second resource utilization of the cloud service associated with the second client device that accesses the cloud service;
determining, by the one or more processors, based on the first resource utilization and the second resource utilization, a predicted resource utilization; and
generating, by the one or more processors, an alert responsive to the predicted resource utilization greater than a threshold.

* * * * *